Figure 1:
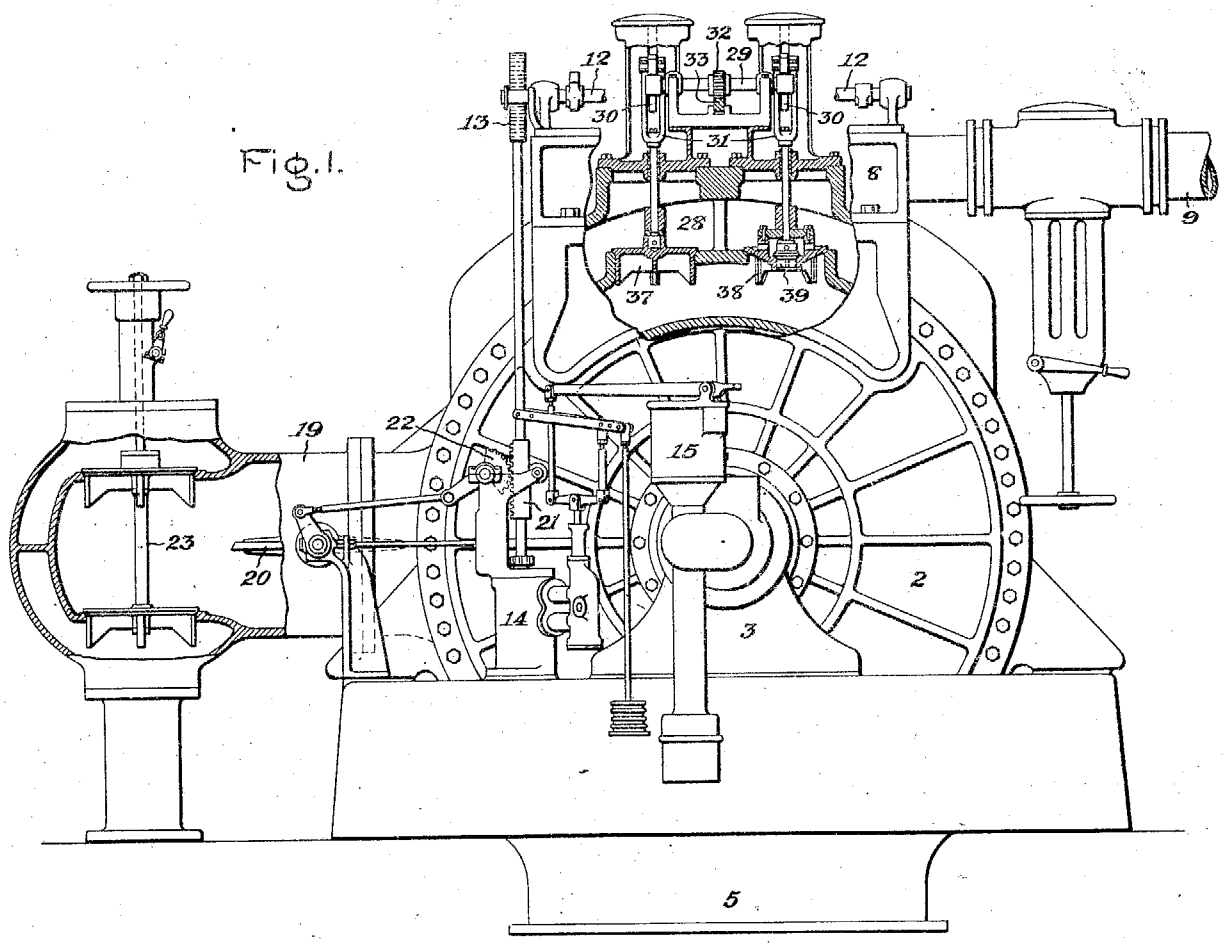

O. JUNGGREN.

MIXED PRESSURE TURBINE.

Reissued July 14, 1914. 13,772.

APPLICATION FILED JUNE 5, 1914.

3 SHEETS—SHEET 1.

Witnesses:
Marcus L. Byng.
J. Ellis Glen

Inventor:
Oscar Junggren,
by A. Mudge Davis
His Attorney.

O. JUNGGREN.

MIXED PRESSURE TURBINE.

Reissued July 14, 1914

APPLICATION FILED JUNE 5, 1914.

13,772.

3 SHEETS—SHEET 2.

Witnesses:

Marcus L. Byng.

J. Ellis Glen

Inventor:

Oscar Junggren, by Albert G. Davis

His Attorney.

Reissued July 14, 1914.
O. JUNGGREN.
MIXED PRESSURE TURBINE.
APPLICATION FILED JUNE 5, 1914.
13,772.
3 SHEETS—SHEET 3.
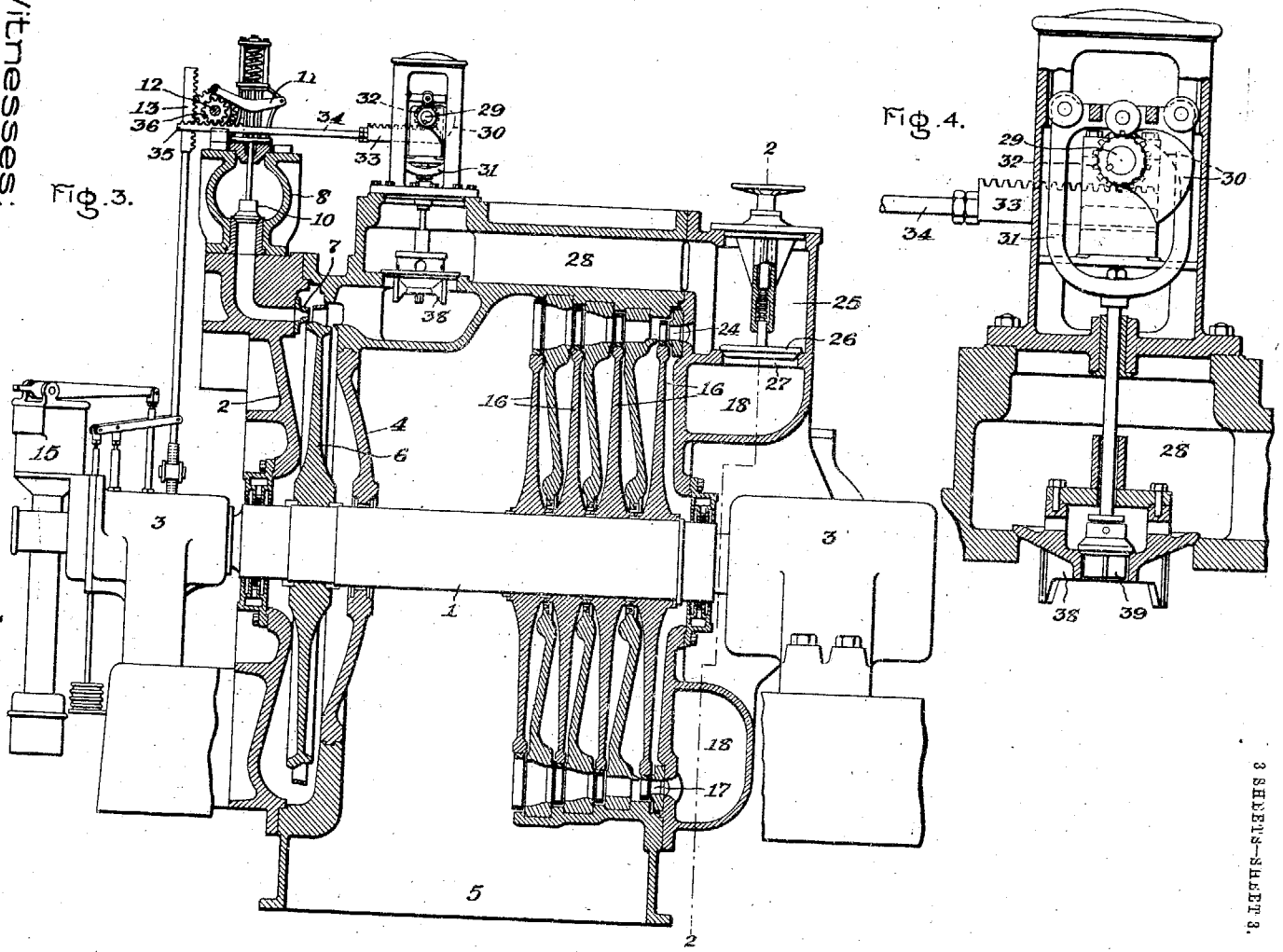
Witnesses:
Marcus L. Byng
J. Ellis Klein.
Inventor:
Oscar Junggren.
by Arthur S. Dann
His Attorney.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

MIXED-PRESSURE TURBINE.

13,772. Specification of Reissued Letters Patent. Reissued July 14, 1914.

Original No. 1,091,345, dated March 24, 1914, Serial No. 733,977. Application for reissue filed June 5, 1914. Serial No. 843,270.

*To all whom it may concern:*

Be it known that I, OSCAR JUNGGREN, a citizen of the United States, residing at Schenectady, county of Schenectady, State of New York, have invented certain new and useful Improvements in Mixed-Pressure Turbines, of which the following is a specification.

This invention relates to elastic fluid turbines and especially to those of the mixed pressure type wherein provision is made for utilizing low pressure steam so long as the supply is sufficient to carry the load, any deficiency in this respect being made up by high pressure steam admitted after the low pressure throttle valve has become wide open. In such systems it is, of course, desirable to have the highest efficiency possible when the unit is run with low pressure steam as well as when it is supplied with high pressure fluid. Heretofore it has been proposed for the sake of simplicity to use a portion of the first bucket wheel for high pressure steam and the remainder for low pressure. While this is cheaper, it is not the most economical arrangement, as the buckets are designed necessarily for low pressure operation and are not so efficient when supplied with high pressure steam. Another arrangement is to have one of the wheels equipped with buckets properly designed for high pressure steam only, and allow this wheel to run idle when the machine is operating under low pressure. But this wheel is a detriment at such times owing to the rotation losses it entails due to rotating it in the low pressure steam. Another suggestion is to make the high pressure part of the unit quite independent of the low pressure part, but connect the high pressure stage with the condenser by a valve which opens automatically when the high pressure steam is shut off, so that when the high pressure end is running idle the wheel will rotate in a vacuum with minimum losses. The two parts of the turbine are connected by a passage controlled by an automatic valve which opens when the high pressure steam is admitted to its stage, and permits said steam to exhaust into the low pressure end of the turbine.

My invention relates to a mixed pressure turbine of this latter class, but I have simplified the construction and made the machine more compact. Provision is made for keeping the high pressure stage open at all times to the condenser vacuum, but through a restricted passage which cuts down leakage losses when the high pressure end is operating. I provide a special set of nozzles for receiving the exhaust from the high pressure end of the machine and directing it upon the buckets of the first stage low pressure wheels. I also arrange for admitting the low pressure steam to these special nozzles in case of an extraordinary overload. Two or more automatic valves are used in the passage which conveys the exhaust from the high pressure wheel to the special low pressure nozzles, and these valves are arranged to operate in parallel.

Figure 2:
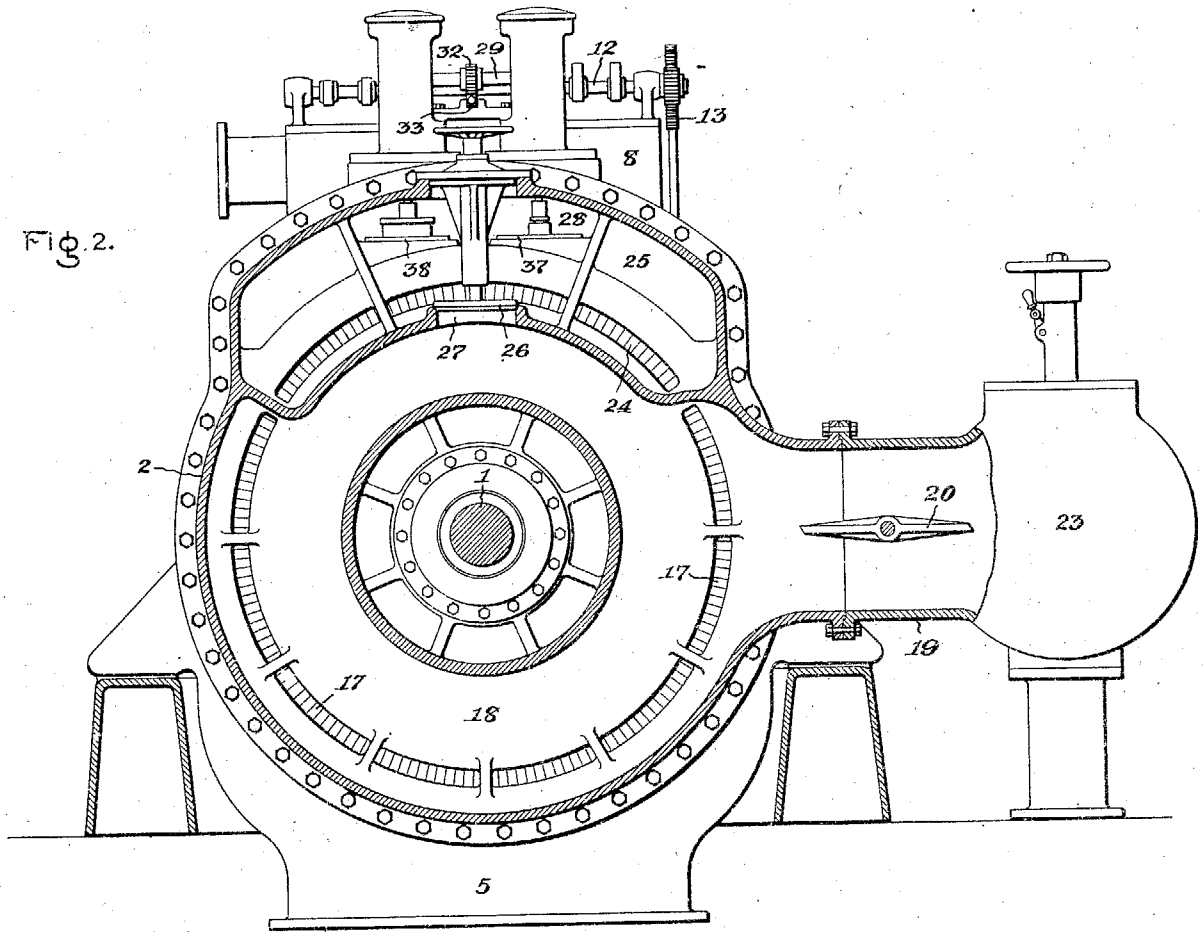

In the accompanying drawings, Figure 1 is an end elevation, partly in section, of a mixed pressure turbine embodying my improvements; Fig. 2 is a sectional end elevation, taken on the line 2—2 of Fig. 3; Fig. 3 is a vertical longitudinal section, and Fig. 4 is an enlarged sectional view of one of the automatic check valves controlling the passage between the high pressure end and the low pressure end of the unit.

The turbine illustrated is a horizontal machine of the Curtis type. The shaft 1 passes through the casing 2 and is journaled in suitable pillow blocks 3, Fig. 3. A diaphragm 4 shuts off one end of the casing from the downwardly-opening condenser exhaust conduit 5, forming a stage chamber for one or more bucket wheels 6 mounted on the shaft 1. Only one stage and one wheel are shown in the drawing, but it will be readily understood that the number of such stages and wheels is immaterial. High pressure steam is supplied to this wheel by suitable nozzles 7 opening from a steam chest 8 connected with the steam main 9, Fig. 1. The nozzles are controlled by nozzle valves 10, which are operated by any suitable control mechanism. I have illustrated a familiar construction, in which each valve is lifted by a lever 11, operated by a cam on a shaft 12, which is geared to a rack 13 actuated by a hydraulic motor 14. The pilot valve of this motor is controlled by the speed-responsive governor 15.

The opening in the diaphragm 4 through which the shaft 1 passes is not packed, and affords a restricted opening through which the condenser vacuum may work into the high pressure stage when the high pressure steam is shut off. When the high pressure steam is being used in this stage, a small portion of the exhaust from the wheel 6 will escape around the shaft directly into the condenser, but the amount of such leakage steam will not be serious owing to the restricted nature of the annular opening around the shaft. Mounted upon the shaft 1, also, are the low pressure bucket wheels 16, preferably each in its own stage, the four which are shown being merely illustrative of a plurality of such wheels. The low pressure steam is applied to the first of these wheels through nozzles 17, Fig. 3, which receive steam from the nearly annular chamber 18, Figs. 2 and 3, concentric with the shaft and communicating directly with the low pressure steam main 19. A butterfly throttle valve 20 in said main regulates the supply of low pressure steam and is in its turn controlled by the motor 14 through the rack 21, Fig. 1, segment gear 22 and operative connections between said gear and the spindle of said valve. The arrangement is such that the motor opens the low pressure throttle valve wide, before beginning to open the high pressure nozzle valves. A hand-operated double-beat stop valve 23 enables the attendant to shut off the low pressure steam at will. The last of the low pressure wheels exhausts into the condenser exhaust conduit 5.

In addition to the nozzles 17 receiving low pressure steam from the chamber 18, there is a set of nozzles 24, Figs. 2 and 3, which deliver steam from the segmental chamber 25 to the low pressure wheels. A hand-operated valve 26 controls a port 27 between the chambers 18 and 25 so that in case of an unusual overload the low pressure steam can be admitted to the nozzles 24. Ordinarily, however, the valve 26 will remain closed; the main purpose of the chamber 25 and nozzles 24 being to utilize the exhaust steam from the high pressure end of the turbine. After leaving the wheel 6, the high pressure steam flows through a passage 28 to the chamber 25. In order to give ample area without too great height, this passage is made quite wide, as shown best in Fig. 2. One or more check valves are interposed at a convenient point in said passage to prevent any leakage of low pressure steam from the first low pressure stage to the high pressure end when the latter is not in use. Two such valves are shown, preferably arranged to be opened and closed positively by mechanism connected with the valve gear of the high pressure wheel. Steam flows through these valves in parallel. The mechanism illustrated comprises a shaft 29 carrying cams 30 which act upon yokes 31 attached to the stems of the check valves. A pinion 32 on said shaft meshes with a rack 33 connected by a rod 34 with a second rack 35 which is in mesh with a pinion 36 on the cam shaft 12. When the motor 14 actuates this latter shaft, the movement is communicated to the cam shaft 29 and the valves 37, 38 are opened. One of these valves may contain a pilot valve 39 seated in an opening in the main valve and arranged to be lifted by the cam 30 in advance of both the main valves. This affords a simple way of breaking the vacuum in the high pressure wheel chamber, since it takes far less energy to lift the pilot valve than it does to lift the entire check valve.

When the turbine is running on low pressure steam, the condenser vacuum works through the unpacked shaft-bearing in the diaphragm 4 and into the high pressure end of the machine, so that the idle high pressure wheel runs in a vacuum with a minimum of rotation losses. The check-valves 37, 38 prevent this vacuum from being destroyed by low pressure steam backing through the passage 28 from the first stage of the low pressure end. By arranging these valves to be operated positively, I avoid all danger of their sticking to their seats or failing to work from any other cause.

The machine operates primarily as a low pressure turbine, but in case of an increase of load beyond the capacity of the low pressure end, the motor 14 opens the high pressure valves, and the high pressure wheel supplements the low pressure end, turning its exhaust also through the low pressure wheels and thus increasing their torque.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A mixed pressure turbine having a high pressure end and a low pressure end, and provided with a restricted constantly-open passage between the condenser and the high pressure stage for establishing a vacuum in the high pressure end when the machine is running on low pressure steam.

2. A mixed pressure turbine having a high pressure end and a low pressure end, a passage for conveying the exhaust steam from the former to the latter, a check valve in said passage, and a restricted constantly-open passage connecting the high pressure end with the condenser.

3. A mixed pressure turbine having a high pressure wheel and nozzles, valve gear controlling the admission of high pressure steam to said nozzles, low pressure wheels and nozzles therefor, means for supplying low pressure steam to a portion of said nozzles, and means for conveying to the remainder of said nozzles the exhaust steam from the high pressure wheel.

4. A mixed pressure turbine having a high pressure wheel and nozzles, valve gear controlling the admission of high pressure steam to said nozzles, low pressure wheels and nozzles therefor, means for supplying low pressure steam to a portion of said nozzles, a passage for conveying to the remainder of said nozzles the exhaust steam from the high pressure wheel, and one or more check valves in said passage opening toward said low pressure nozzles.

5. A mixed pressure turbine having a high pressure wheel and nozzles, valve gear controlling the admission of high pressure steam to said nozzles, low pressure wheels and nozzles therefor, means for supplying low pressure steam to a portion of said nozzles, a passage for conveying to the remainder of said nozzles the exhaust steam from the high pressure wheel, one or more check valves in said passage opening toward said low pressure nozzles, and means for positively operating said valves when said high pressure valve gear goes into operation.

6. A mixed pressure turbine having a high pressure wheel and nozzles, valve gear controlling the admission of high pressure steam to said nozzles, low pressure wheels and nozzles therefor, means for supplying low pressure steam to a portion of said nozzles, a passage for conveying to the remainder of said nozzles the exhaust steam from the high pressure wheel, one or more check valves in said passage opening toward said low pressure nozzles, and operative connections between said valves and the high pressure valve gear.

7. A mixed pressure turbine having a high pressure wheel and nozzles, valve gear controlling the admission of high pressure steam to said nozzles, low pressure wheels and nozzles therefor, means for supplying low pressure steam to a portion of said nozzles, a passage for conveying to the remainder of said nozzles the exhaust steam from the high pressure wheel, one or more check valves in said passage opening toward said low pressure nozzles, and a pilot valve seated in an opening in one of said check valves.

8. A mixed pressure turbine having a high pressure wheel and nozzles, valve gear controlling the admission of high pressure steam to said nozzles, low pressure wheels and nozzles therefor, means for supplying low pressure steam to a portion of said nozzles, a wide passage for conveying to the remainder of said nozzles the exhaust steam from the high pressure wheel, and two or more check valves operating in parallel to control said passage.

9. A mixed pressure turbine having a high pressure wheel and nozzles, low pressure wheels and nozzles, means for supplying low pressure steam to a portion of said low pressure nozzles, and means for admitting low pressure steam to the remainder of said nozzles at will.

10. A mixed pressure turbine having a high pressure end and a low pressure end, means for supplying low pressure steam to a portion of the low pressure nozzles, a passage conveying the exhaust from the high pressure end to the remainder of said low pressure nozzles, one or more check valves in said passage, and a hand valve for admitting the low pressure steam to said passage.

11. A mixed pressure turbine having a horizontal casing comprising a condenser exhaust conduit, a high pressure stage chamber at one side of said conduit, low pressure stages at the other side of said conduit and discharging thereinto, a shaft extending through said conduit and stages, and a restricted constantly-open annular passage around said shaft between said conduit and said high pressure stage.

In witness whereof, I have hereunto set my hand this 8th day of August, 1913.

OSCAR JUNGGREN.

Witnesses:
BENJAMIN B. HULL,
HELEN ORFORD.